United States Patent [19]
Conte

[11] Patent Number: 6,035,970
[45] Date of Patent: Mar. 14, 2000

[54] LEVER-ACTUATED BICYCLE ENERGY STORAGE ASSEMBLY

[76] Inventor: Jeffery Conte, 5929 Park Rd., Doraville, Ga. 30340

[21] Appl. No.: 09/133,441

[22] Filed: Aug. 13, 1998

[51] Int. Cl.[7] ............................... F03G 1/00; B62M 1/10
[52] U.S. Cl. ............................................. 185/39; 280/212
[58] Field of Search ...................... 185/39; 280/215, 280/212; 188/24.19, 24.21

[56] References Cited

U.S. PATENT DOCUMENTS

| | | | |
|---|---|---|---|
| 554,650 | 2/1896 | Brubaker | 185/39 |
| 567,629 | 9/1896 | Young | 280/215 |
| 784,345 | 3/1905 | Pepper | 280/212 |
| 1,374,797 | 4/1921 | Zaborsky | 280/215 |
| 2,384,728 | 9/1945 | Crumble | 280/215 |
| 2,638,359 | 5/1953 | Crumble | 280/215 |
| 2,908,356 | 10/1959 | Daarud | 185/39 |
| 2,965,393 | 12/1960 | Cauchon | 280/212 |
| 4,744,577 | 5/1988 | Brent et al. | 280/215 |
| 5,425,434 | 6/1995 | Romano | 188/24.19 |
| 5,431,257 | 7/1995 | Rocca et al. | 188/24.21 |

Primary Examiner—David A. Bucci
Assistant Examiner—Brandon C. Stallman

[57] ABSTRACT

An energy storage drive assembly is provided for a bicycle and includes a coil spring mounted on the bicycle with at least one roller in abutment with a wheel of the bicycle. The energy storage drive assembly is adapted for storing energy on the spring in a first mode and further effecting the movement of the bicycle in a forward direction with the stored energy in a second mode.

10 Claims, 3 Drawing Sheets

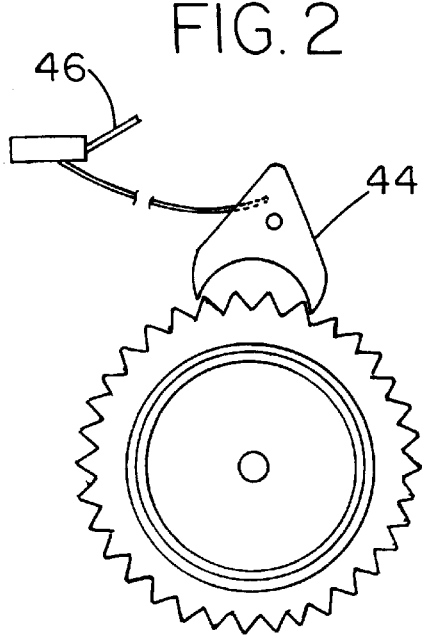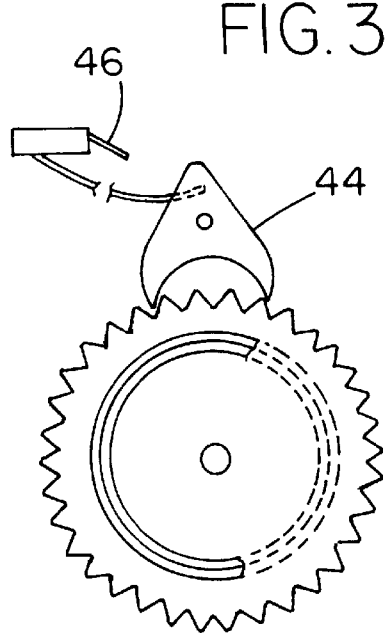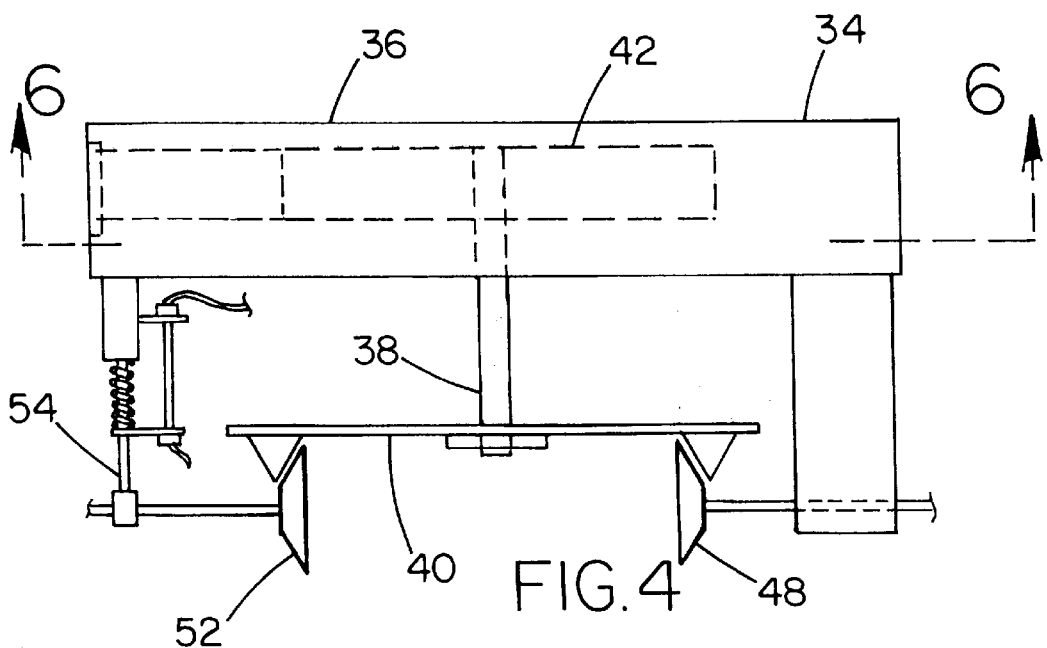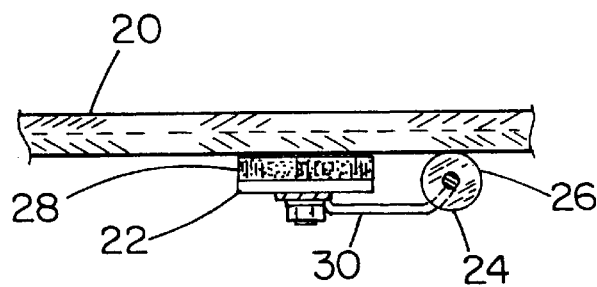

LEVER-ACTUATED BICYCLE ENERGY STORAGE ASSEMBLY

BACKGROUND OF THE INVENTION

1. Field of the Invention

The present invention relates to bicycle energy storage systems and more particularly pertains to a new lever-actuated bicycle energy storage assembly for effecting the forward movement of a bicycle with energy stored during braking.

2. Description of the Prior Art

The use of bicycle energy storage systems is known in the prior art. More specifically, bicycle energy storage systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle energy storage systems include U.S. Pat. No. 4,108,459; U.S. Pat. No. 5,188,003; U.S. Pat. No. 5,035,678; U.S. Pat. No. 5,431,257; U.S. Pat. No. 5,425,434; and U.S. Pat. No. 4,416,464, wherein each of the foregoing references are incorporated herein by reference.

In these respects, the lever-actuated bicycle energy storage assembly according to the present invention substantially departs from the conventional concepts and designs of the prior art, and in so doing provides an apparatus primarily developed for the purpose of effecting the forward movement of a bicycle with energy stored during braking.

SUMMARY OF THE INVENTION

In view of the foregoing disadvantages inherent in the known types of bicycle energy storage systems now present in the prior art, the present invention provides a new lever-actuated bicycle energy storage assembly construction wherein the same can be utilized for effecting the forward movement of a bicycle with energy stored during braking.

The general purpose of the present invention, which will be described subsequently in greater detail, is to provide a new lever-actuated bicycle energy storage assembly apparatus and method which has many of the advantages of the bicycle energy storage systems mentioned heretofore and many novel features that result in a new lever-actuated bicycle energy storage assembly which is not anticipated, rendered obvious, suggested, or even implied by any of the prior art bicycle energy storage systems, either alone or in any combination thereof.

To attain this, the present invention generally comprises a bicycle having a frame with a cross bar, a handle, and a pair of wheels. Mounted on the frame is a rear brake situated adjacent to a rear wheel of the bicycle. The rear brake has a lever mounted on the handle for engaging a brake pad of the rear brake against the rear wheel upon the depression thereof. Next provided is a pair of rollers including a rear roller mounted to the rear brake adjacent to the associated brake pad via an interconnect member. Note FIGS. 5, 7 & 8. The rear roller is adapted for abutting a first side of the rear wheel of the bicycle upon the engagement of the brake pad with the wheel. When abutted with the wheel, the rear roller rotates coincidentally therewith. As shown in FIG. 1, the pair of rollers further includes a front roller mounted on the frame of the bicycle. The front roller remains in constant abutment with a second side of a front wheel of the bicycle for rotating therewith. With reference now to FIGS. 1–3 and 6, an energy storage unit includes a housing mounted on the cross bar of the bicycle. A rotating shaft is coupled between side faces of the housing. Fixedly mounted on the rotating shaft are a large bevel gear and a coil spring. The coil spring has a first end fixedly mounted on the rotating shaft and a second end fixedly mounted on the housing. The energy storage unit further includes a spring loaded double edged pawl rotatably mounted within the housing. As shown in FIGS. 2 & 3, the pawl is equipped with an unbiased first orientation for only allowing the rotation of the large bevel gear in a first direction. This allows the storage of energy on the spring. The pawl further has a biased second orientation for only allowing the rotation of the large bevel gear in a second direction. This allows the dispensing of energy from the spring. Lastly, a trigger lever is coupled to the handle of the bicycle and is further connected to the pawl for urging the same into the biased second orientation upon the depression thereof. As shown in FIG. 4, an energy storage small bevel gear is rotatably mounted on the housing of the energy storage unit in engagement with the large bevel gear. The energy storage small bevel gear is further coupled to the rear roller via a sleeved cable for rotating coincidentally therewith. Upon the rotation of the rear roller, the small bevel gear rotates the large bevel gear in the first direction for storing energy within the energy storage unit Finally, an energy dispensing small bevel gear is rotatably mounted on the housing of the energy storage unit via a spring loaded arm. The energy dispensing small bevel gear is further connected to the front roller via a sleeved cable. The spring loaded arm has an unbiased orientation with the energy dispensing small bevel gear out of engagement with the large bevel gear. The spring loaded arm is further connected to the trigger lever of the energy storage unit. Upon the depression of the trigger lever, the spring loaded arm has a biased orientation for engaging the energy dispensing small bevel gear with the large bevel gear. When engaged, the energy dispensing small bevel gear serves for rotating the front roller to effect the movement of the bicycle in a forward direction.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new lever-actuated bicycle energy storage assembly apparatus and method which has many of the advantages of the bicycle energy storage systems mentioned heretofore and many novel features that result in a new lever-actuated bicycle energy storage assembly which is not anticipated, rendered obvious, suggested, or even implied by any of the prior art bicycle energy storage systems, either alone or in any combination thereof.

It is another object of the present invention to provide a new lever-actuated bicycle energy storage assembly which may be easily and efficiently manufactured and marketed.

It is a further object of the present invention to provide a new lever-actuated bicycle energy storage assembly which is of a durable and reliable construction.

An even further object of the present invention is to provide a new lever-actuated bicycle energy storage assembly which is susceptible of a low cost of manufacture with regard to both materials and labor, and which accordingly is then susceptible of low prices of sale to the consuming public, thereby making such lever-actuated bicycle energy storage assembly economically available to the buying public.

Still yet another object of the present invention is to provide a new lever-actuated bicycle energy storage assembly which provides in the apparatuses and methods of prior art some of the advantages thereof, while simultaneously overcoming some of the disadvantages normally associated therewith.

Still another object of the present invention is to provide a new lever-actuated bicycle energy storage assembly for effecting the forward movement of a bicycle with energy stored during braking.

Even still another object of the present invention is to provide a new lever-actuated bicycle energy storage assembly that includes a coil spring mounted on the bicycle with at least one roller in abutment with a wheel of the bicycle. The energy storage drive assembly is adapted for storing energy on the spring in a first mode and further effecting the movement of the bicycle in a forward direction with the stored energy in a second mode.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a front view of the pawl of the present invention in the unbiased orientation thereof.

FIG. 3 is a front view of the pawl of the present invention in the biased orientation thereof.

FIG. 4 is a top view of the present invention.

FIG. 5 is an upper view of the rear roller and rear brake of the present invention.

DESCRIPTION OF THE PREFERRED EMBODIMENT

Figure 1:
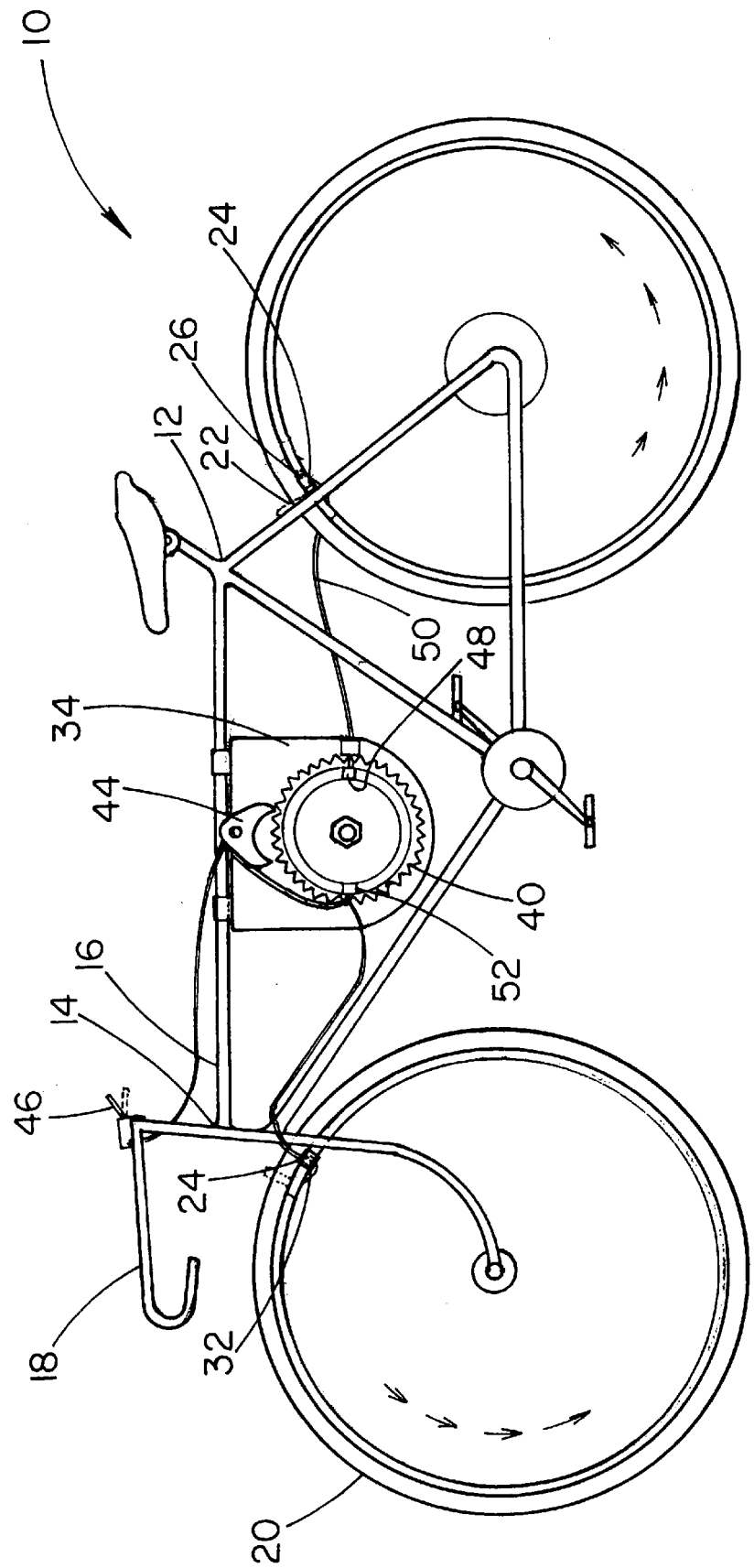
FIG. 1 is a side view of a new lever-actuated bicycle energy storage assembly according to the present invention.
Figure 6:
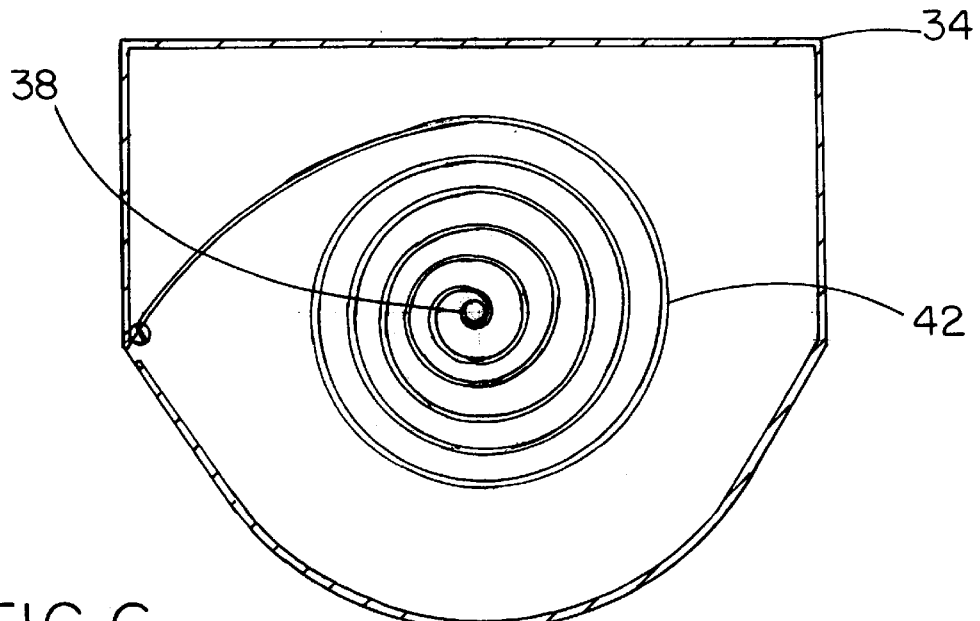
FIG. 6 is a side cross-sectional view of the energy storage unit of the present invention.
Figure 7:
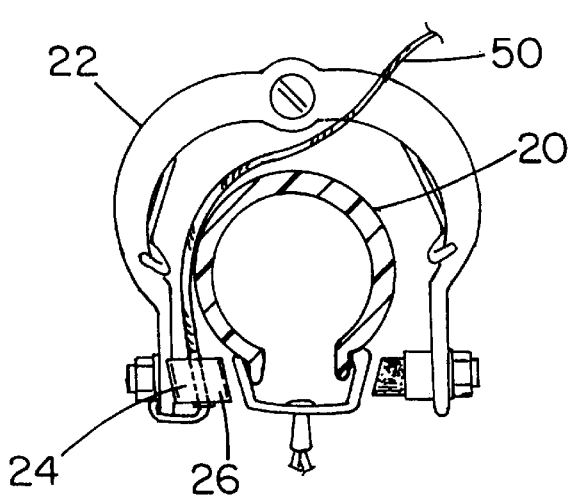
FIG. 7 is a rear view of the rear brake of the present invention.
Figure 8:
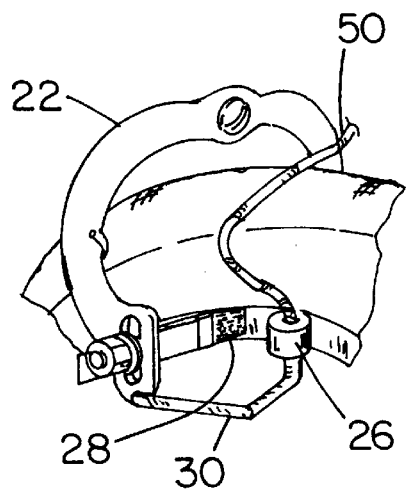
FIG. 8 is a perspective view of the rear brake of the present invention.

With reference now to the drawings, and in particular to FIGS. 1 through 8 thereof, a new lever-actuated bicycle energy storage assembly embodying the principles and concepts of the present invention and generally designated by the reference numeral 10 will be described.

The present invention, designated as numeral 10, includes a bicycle 12 having a frame 14 with a cross bar 16, a handle 18, and a pair of wheels 20. Mounted on the frame is a rear brake 22 situated adjacent to a rear wheel of the bicycle. The rear brake has a lever mounted on the handle for engaging a brake pad of the rear brake against the rear wheel upon the depression thereof.

Next provided is a pair of rollers 24 including a rear roller 26 mounted on the rear brake adjacent to the associated brake pad 28 via an interconnect member 30. Note FIGS. 5, 7 & 8. The rear roller is adapted for abutting a first side of the rear wheel of the bicycle upon the engagement of the brake pad with the wheel. When abutted with the wheel, the rear roller rotates coincidentally therewith. As shown in FIG. 1, the pair of rollers further includes a front roller 32 mounted on the frame of the bicycle. The front roller remains in constant abutment with a second side of a front wheel of the bicycle for rotating therewith.

With reference now to FIGS. 1–4 and 6, an energy storage unit 34 includes a housing 36 mounted on the cross bar of the bicycle. A rotating shaft 38 is coupled between side faces of the housing. Fixedly mounted on the rotating shaft are a large bevel gear 40 and a coil spring 42. The coil spring has a first end fixedly mounted on the rotating shaft and a second end fixedly mounted on the housing. The energy storage unit further includes a spring loaded double edged pawl 44 rotatably mounted within the housing. As shown in FIGS. 2 & 3, the pawl is equipped with an unbiased first orientation for only allowing the rotation of the large bevel gear in a first direction. This allows the storage of energy on the spring. The pawl further has a biased second orientation for only allowing the rotation of the large bevel gear in a second direction. This allows the dispensing of energy from the spring. As an option, the large bevel gear may be equipped with radially extending teeth to be engaged by the pawl. Lastly, a trigger lever 46 is coupled to the handle of the bicycle and is further connected to the pawl for urging the same into the biased second orientation upon the depression thereof.

As shown in FIG. 4, an energy storage small bevel gear 48 is rotatably mounted on the housing of the energy storage unit in engagement with the large bevel gear. The energy storage small bevel gear is further coupled to the rear roller via a sleeved cable 50 for rotating coincidentally therewith.

Such sleeved cable is similar to that used in the art of bicycle speedometers. Upon the rotation of the rear roller, the small bevel gear rotates the large bevel gear in the first direction for storing energy within the energy storage unit.

Finally, an energy dispensing small bevel gear 52 is rotatably mounted on the housing of the energy storage unit via a spring loaded arm 54. The energy dispensing small bevel gear is further connected to the front roller via a sleeved cable for rotating coincidentally therewith. The spring loaded arm has an unbiased orientation with the energy dispensing small bevel gear out of engagement with the large bevel gear. The spring loaded arm is further connected to the trigger lever of the energy storage unit. It should be noted that the connection between the trigger lever and the pawl and spring loaded arm is designed in a manner similar to the art of bicycle brakes. Upon the depression of the trigger lever, the spring loaded arm has a biased orientation for engaging the energy dispensing small bevel gear with the large bevel gear. When engaged, the energy dispensing small bevel gear serves for rotating the front roller to effect the movement of the bicycle in a forward direction.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An energy storage drive assembly for a bicycle comprising, in combination:
    a bicycle including a frame with a cross bar, a handle, a pair of wheels, and a rear brake mounted on the frame adjacent to a rear wheel of the bicycle, wherein the rear brake has a lever mounted on the handle for engaging a brake pad of the rear brake against the rear wheel upon the depression thereof for braking purposes;
    a pair of rollers including a rear roller mounted to the rear brake adjacent to the associated brake pad via an interconnect member for abutting a first side of the rear wheel of the bicycle upon the engagement of the brake pad with the wheel for rotating therewith, the pair of rollers further including a front roller mounted on the frame of the bicycle and in constant abutment with a second side of a front wheel of the bicycle for rotating therewith;
    an energy storage unit including a housing mounted on the cross bar of the bicycle, a rotating shaft coupled between side faces of the housing, a large bevel gear fixedly mounted on the rotating shaft, a coil spring having a first end fixedly mounted on the rotating shaft and a second end fixedly mounted on the housing, a spring loaded double edged pawl rotatably mounted within the housing with an unbiased first orientation for only allowing the rotation of the large bevel gear in a first direction for allowing the storage of energy on the spring and a biased second orientation for only allowing the rotation of the large bevel gear in a second direction for allowing the dispensing of energy from the spring, and a trigger lever coupled to the handle of the bicycle and connected to the pawl for urging the same into the biased second orientation upon the depression thereof;
    an energy storage small bevel gear rotatably mounted on the housing of the energy storage unit in engagement with the large bevel gear and further coupled to the rear roller via a sleeved cable for rotating coincidentally therewith, wherein upon the rotation of the rear roller, the small bevel gear rotates the large bevel gear in the first direction for storing energy within the energy storage unit; and
    an energy dispensing small bevel gear rotatably mounted on the housing of the energy storage unit via a spring loaded arm which has an unbiased orientation with the energy dispensing small bevel gear out of engagement with the large bevel gear, the spring loaded arm further connected to the trigger lever of the energy storage unit for urging the spring loaded arm into a biased orientation upon the depression of the trigger lever to engage the energy dispensing small bevel gear with the large bevel gear, wherein the energy dispensing small bevel gear is further connected to the front roller via a sleeved cable for rotating the front roller to effect the movement of the bicycle in a forward direction when the spring loaded arm is in the biased orientation thereof.

2. An energy storage assembly for a bicycle comprising, in combination:
    a bicycle;
    a coil spring mounted on the bicycle;
    at least one roller in abutment with a wheel of the bicycle, the roller being connected to the spring via a sleeved cable; and
    wherein the energy storage drive assembly is adapted for storing energy on the spring in a first mode and further effecting the movement of the bicycle in a forward direction with the energy in a second mode.

3. An energy storage drive assembly as set forth in claim 2 wherein the energy storage drive assembly operates in the second mode only upon the depression of a trigger on the bicycle.

4. An energy storage drive assembly as set forth in claim 2 wherein the at least one roller is connected to the spring via a pair of bevel gears.

5. An energy storage drive assembly as set forth in claim 2 wherein a pair of rollers is included a first one of which is dedicated for storing energy on the spring and a second one of which is dedicated for effecting the movement of the bicycle in a forward direction with the energy in the second mode.

6. An energy storage drive assembly as set forth in claim 2 wherein the at least one roller is mounted on a brake of the bicycle.

7. An energy storage assembly for a bicycle comprising, in combination:

a bicycle;

a coil spring mounted on the bicycle;

wherein the energy storage drive assembly is adapted for storing energy on the spring in a first mode and further effecting the movement of the bicycle in a forward direction with the energy in a second mode; and a pair of rollers is included a first one of which is dedicated for storing energy on the spring and a second one of which is dedicated for effecting the movement of the bicycle in a forward direction with the energy in the second mode;

at least one roller of said pair of rollers is in abutment with a wheel of the bicycle.

8. An energy storage drive assembly as set forth in claim 7 wherein the energy storage drive assembly operates in the second mode only upon the depression of a trigger on the bicycle.

9. An energy storage drive assembly as set forth in claim 7 wherein the at least one roller is connected to the spring via a pair of bevel gears.

10. An energy storage drive assembly as set forth in claim 7 wherein the at least one roller is mounted on a brake of the bicycle.

* * * * *